2,846,473

BACTERICIDAL N(HALOPHENYL) N'(ALLYL)-N'-(ALKOXYPHENYL) UREAS

David J. Beaver, Richmond Heights, and Paul J. Stoffel, St. Louis, Mo., assignors to Monsanto Chemical Company, St. Louis, Mo., a corporation of Delaware No Drawing. Application August 2, 1956
Serial No. 601,630

5 Claims. (Cl. 260—553)

This invention relates to new and useful N-(alkoxyphenyl) N'-(halophenyl) ureas and to processes for making same.

The compounds of this invention may be represented by the structure

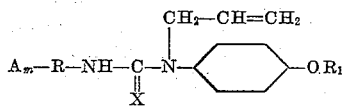

wherein X is sulfur or oxygen, wherein R is the phenyl radical which radical is free of substituents ortho to the nitrogen atom, wherein $R_1$ is a lower alkyl radical (i. e. an alkyl radical containing not more than 5 carbon atoms), wherein A is halogen, and wherein $m$ is an integer from 2 to 3, inclusive. By the term "halogen" as employed in the instant specification and appended claims is meant chlorine and bromine, but preferably chlorine. As illustrative of compounds falling within the scope of this invention is the following:

N-(3,4-dichlorophenyl) N'-allyl N'-(4-methoxyphenyl) urea
N-(3,4-dichlorophenyl) N'-allyl N'-(4-ethoxyphenyl) urea
N-(3,4-dichlorophenyl) N'-allyl N'-(4-isoamyloxyphenyl) urea
N-(3,5-dichlorophenyl) N'-allyl N'-(4-methoxyphenyl) urea
N-(3,4,5-trichlorophenyl) N'-allyl N'-(4-ethoxyphenyl) urea
N-(3,4-dichlorophenyl) N'-allyl N'-(4-n-propoxyphenyl) urea
N-(3,4-dichlorophenyl) N'-allyl N'-(4-isopropoxyphenyl) urea
N-(3,4-dichlorophenyl) N'-allyl N'-(4-isobutoxyphenyl) urea
N-(3,4-dibromophenyl) N'-allyl N'-(4-ethoxyphenyl) urea
N-(3,4-dichlorophenyl) N'-allyl N'-(4-methoxyphenyl) thiourea
N-(3,4-dichlorophenyl) N'-allyl N'-(4-ethoxyphenyl) thiourea The new compounds are prepared by reacting a secondary amine of the structure

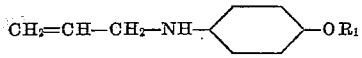

wherein $R_1$ is an alkyl radical containing not more than 5 carbon atoms with an isocyanate of the structure

wherein A is halogen, wherein $m$ is a whole number from 2 to 3, inclusive, wherein R is the phenyl radical which radical is free of substituents ortho to the nitrogen atom, and wherein X is sulfur or oxygen, in the presence of an inert solvent at a temperature in the range of room temperature to the reflux temperature of the system.

As illustrative of the preparation of the secondary amine reactants is the following:

EXAMPLE A

To a suitable reaction vessel equipped with a thermometer, agitator, and reflux condenser is added 330.0 parts by weight of 4-ethoxyaniline. The mass is heated to about 75–80° C. and with agitation is added dropwise 92.0 parts by weight of allyl chloride. Upon completion of the allyl chloride addition the slurry so obtained is held at 80° C. for about 16 hours. The mass is then cooled to about room temperature and thereto is added with agitation aqueous sodium hydroxide containing 80 parts by weight of sodium hydroxide and 500 parts by weight of water. The oil phase is separated and extracted with several portions of diethyl ether. The extracts are combined, dried over calcium chloride and subjected to vacuum distillation to remove the diethyl ether and any unreacted reactants. The light brown oily product is N-allyl 4-ethoxyaniline, which boils at 99.4–100.6° C. at 1.0 mm. of mercury pressure.

Employing the procedure of Example A but replacing 4-ethoxyaniline with an equimolecular amount of 4-methoxyaniline, 4-isopropoxyaniline and 4-isobutoxyaniline, respectively, there is obtained N-allyl 4-methoxyaniline, N-allyl 4-isopropoxyaniline and N-allyl 4-isobutoxyaniline. Instead of allyl chloride, allyl bromide may be employed in preparing the N-allyl alkoxy-substituted aniline.

As illustrative of the preparation of the compounds of this invention is the following:

Example I

To a suitable reaction vessel equipped with a thermometer, agitator, and reflux condenser and containing 17.7 parts by weight of N-allyl 4-ethoxyaniline in approximately 50 parts by weight of diethyl ether is added dropwise a solution of 18.8 parts by weight of 3,4-dichlorophenylisocyanate in approximately 50 parts by weight of diethyl ether at such a rate so as to maintain gentle reflux. Upon completion of the isocyanate addition the reaction mass is agitated for about 2 hours. Upon evaporation of the ether solvent there is obtained a dark brown oil identified as N-(3,4-dichlorophenyl) N'-allyl N'-(4-ethoxyphenyl) urea.

Example II

To a suitable reaction vessel equipped with a thermometer, agitator, and reflux condenser and containing 17.7 parts by weight of N-allyl 4-ethoxyaniline in approximately 50 parts by weight of diethyl ether is added dropwise a solution of 18.8 parts by weight of 3,5-dichlorophenylisocyanate in approximately 50 parts by weight of diethyl ether at such a rate so as to maintain gentle reflux. Upon completion of the isocyanate addition the reaction mass is agitated for about 2 hours. Upon evaporation of the ether solvent there is obtained N-(3,5-dichlorophenyl) N'-allyl N'-(4-ethoxyphenyl) urea.

In the preparation of the new compounds of this invention other inert solvents than diethyl ether may be employed, e. g. di-isopropyl ether, methylbutyl ether, the liquid alkanes and the like. The reaction temperature employed in preparing the new compounds will depend upon the particular reactants and in general will be between room temperature and the reflux temperature of the system.

The compounds of this invention are particularly useful in controlling bacterial growth, particularly *Micrococcus pyogenes* var. *aureus*. In this regard they, when compounded with a detergent soap (i. e. an alkali metal salt of a higher fatty acid of animal or vegetable origin, such as stearic acid, lauric acid, palmitic acid, oleic acid, linoleic acid, ricinoleic acid, and the like, or mixtures thereof obtained from tallow, lard, cocoanut oil, palm oil, caster oil, olive oil, cottonseed oil, and the like), provide highly useful antiseptic detergent soap compositions.

In order to illustrate the activity of the new urea derivatives of this invention several were incorporated in an alkali metal fatty acid soap, specifically an "Ivory" brand neutral high grade white toilet soap [a mixture of alkali metal salts of fatty acids whose fatty acid content analyzes

|  | Percent |
|---|---|
| Oleic and linoleic acid | About 46 |
| Stearic acid | About 14 |
| Palmitic acid | About 30 |
| Lower fatty acids (myristic, lauric, etc.) | About 10] | and compared to analogues thereof. The respective compounds which are tabulated below were incorporated in the said "Ivory" brand toilet soap in a weight ratio of one part to 50 parts soap. Aliquots of each were added to a Sabourard's dextrose agar medium so as to give concentrations in parts per million as set forth below of the respective compounds in the agar. The agar in each case was then poured into a Petri dish, allowed to harden, and then inoculated with a standard culture of *Micrococcus pyogenes* var. *aureus* of standard resistance. The incubation in each instance was made at 37° C. for 48 hours. The extent of growth is noted below:

| Compound/Concentration, p. p. m. | 100 | 10 | 1 |
|---|---|---|---|
| N-(3,4-dichlorophenyl) N'-allyl N'-isopropyl urea | heavy | heavy | heavy. |
| N-(3,4-dichlorophenyl) N',N'-diallyl urea | do | do | Do. |
| N-(2,4-dichlorophenyl) N'-(4-methoxyphenyl) urea | none | do | Do. |
| N-(3,4-dichlorophenyl) N'-allyl N'-(4-ethoxyphenyl) urea | do | none | none. |

The same control of *Micrococcus pyogenes* var. *aureus* is obtained by replacing N-(3,4-dichlorophenyl) N'-allyl N'-(4-ethoxyphenyl) urea in the foregoing detergent soap compositions with an equal weight of N-(3,4-dichlorophenyl) N'-allyl N'-(4-methoxyphenyl) urea, N-(3,4-dichlorophenyl) N'-allyl N'-(4-isopropoxyphenyl) urea, N-(3,4,5-trichlorophenyl) N'-allyl N'-(4-ethoxyphenyl) urea, and N-(3,5-dichlorophenyl) N'-allyl N'-(4-ethoxyphenyl) urea. Somewhat weaker control of *Micrococcus pyogenes* var. *aureus* is obtained employing the corresponding thio compounds (i. e., those of the foregoing structure wherein X is sulfur).

Replacing the foregoing "Ivory" brand soap with an equal weight of a "Lux" brand solid neutral white toilet soap (a mixture of alkali metal salts of fatty acids whose fatty acid content analyzes about 45% oleic and linoleic acid, about 30% palmitic acid, about 10% stearic acid, and about 15% lower fatty acids), the same results are obtained. The same results are also obtained using instead of a solid soap a liquid soap, such as that having a 40% alkali metal fatty acid soap content prepared from an alkali metal compound and a mixture of fatty acids obtained from a mixture of 75% cocoanut oil and 25% olive oil. Other alkali metal fatty acid soaps may also be used, e. g. the usual alkali metal (sodium and/or potassium) soaps of higher fatty acids of vegetable or animal origin, such as stearic, lauric, palmitic, oleic, linoleic, ricinoleic, and the like, or mixtures thereof obtained from tallow, lard, cocoanut oil, palm oil, castor oil, olive oil, hydrogenated cottonseed oil, and the like.

Relatively small amounts of these new urea derivatives in a detergent soap composition have been found to yield effective antiseptic detergent soap compositions. Amounts as low as 0.5 to 1% by weight based on the weight of the detergent soap have proved satisfactory. However, it is preferred to employ these urea derivatives in amounts in the order to 1 to 5% by weight based on the detergent soap. While larger amounts, as for example up to 10% by weight, may be employed the upper limit will be determined by practical considerations. Various colors, antioxidants, perfumes, water softeners, emollients, and the like, may be included where desirable in detergent compositions containing these new trichlorocarbanilides. The term "soap" or "detergent soap" as used herein is employed in its popular or ordinary meaning, i. e. those cleansing compositions prepared from an alkali metal compound such as potassium or sodium hydroxide and a fat or fatty acid, both saturated and unsaturated.

While this invention has been described with respect to certain embodiments, it is not so limited and it is to be understood that variations and modifications thereof obvious to those skilled in the art may be made without departing from the spirit or scope of this invention.

What is claimed is:

1. Compounds of the structure

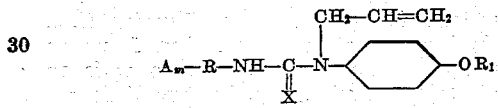

where X is selected from the group consisting of sulfur and oxygen, wherein R is phenyl, wherein $R_1$ is an alkyl radical containing from 1 to 5 carbon atoms, wherein A is halogen, wherein $m$ is an integer from 2 to 3, inclusive, wherein the phenyl radical R is free of ortho substituents, and wherein the halogen substituent A is selected from the group consisting of chlorine and bromine.

2. Compounds of the structure

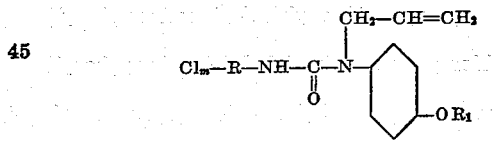

wherein $m$ is an integer from 2 to 3, inclusive, wherein R is a phenyl radical free of ortho substituents, and wherein $R_1$ is the ethyl radical.

3. N-(3,4-dichlorophenyl) N'-allyl N'-(4-ethoxyphenyl) urea.

4. N-(3,4,5-trichlorophenyl) N'-allyl N'-(4-ethoxyphenyl) urea.

5. N-(3,5-dichlorophenyl) N'-allyl N'-(4-ethoxyphenyl) urea.

References Cited in the file of this patent

UNITED STATES PATENTS 2,723,192   Todd _____ Nov. 8, 1955

OTHER REFERENCES

Dains et al.: Journal of the American Chemical Society, vol. 47; page 1984 relied on (1925).

Dains et al.: Journal of the American Chemical Society, vol. 44; page 2637 relied on (1922).